Sept. 6, 1955 J. D. RALSTON 2,717,112
FLUID FLOW PRECISE SHUT-OFF VALVE
Filed Oct. 17, 1952 3 Sheets-Sheet 1

INVENTOR,
JOHN D. RALSTON,
By Herbert G. Minturn,
ATTORNEY.

Sept. 6, 1955    J. D. RALSTON    2,717,112
FLUID FLOW PRECISE SHUT-OFF VALVE
Filed Oct. 17, 1952    3 Sheets-Sheet 2
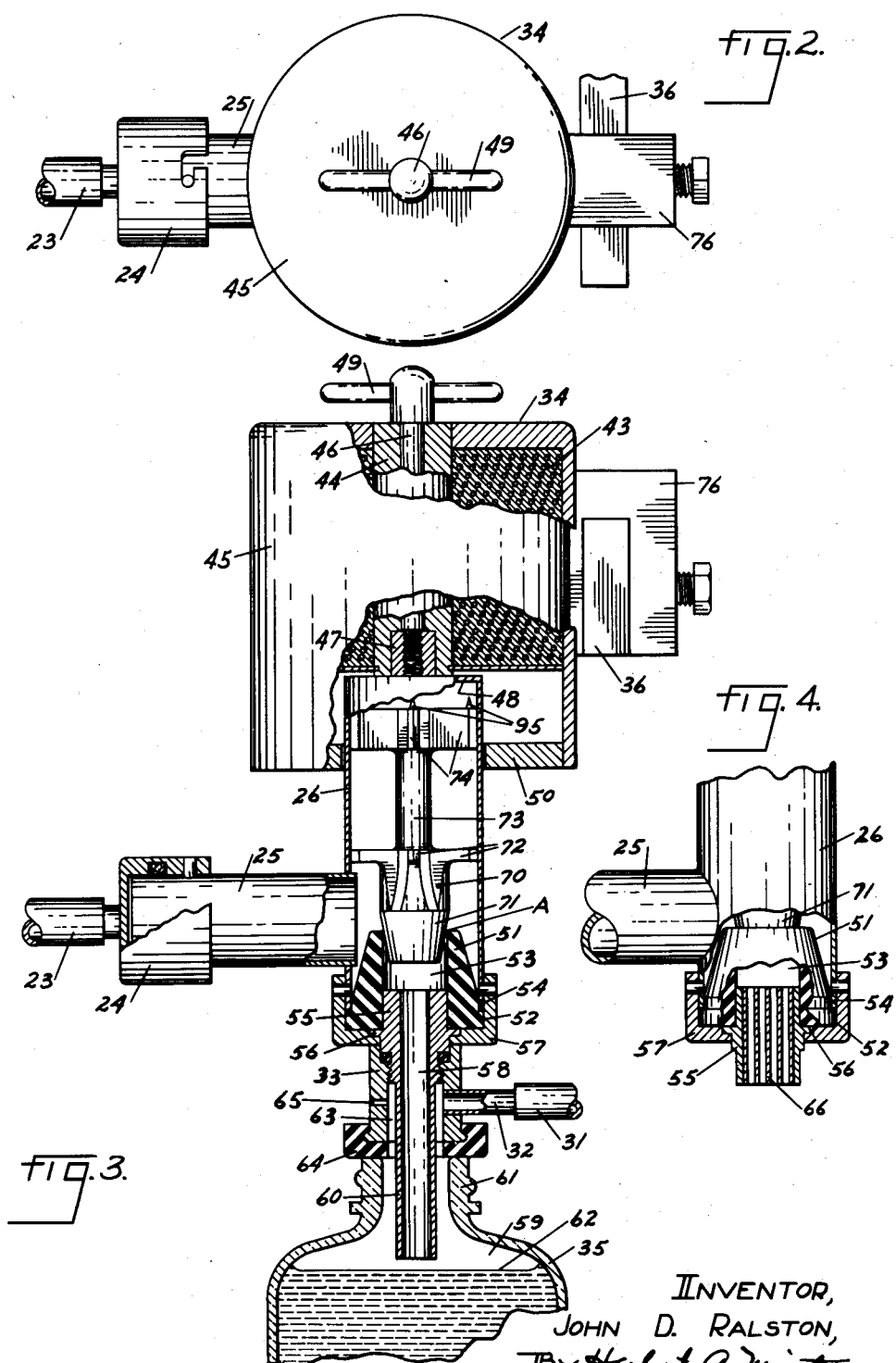
INVENTOR,
JOHN D. RALSTON,
By Herbert Q. Minturn
ATTORNEY.

Sept. 6, 1955  J. D. RALSTON  2,717,112
FLUID FLOW PRECISE SHUT-OFF VALVE
Filed Oct. 17, 1952  3 Sheets-Sheet 3

INVENTOR,
JOHN D. RALSTON,
BY Herbert A. Minturn,
ATTORNEY.

2,717,112

FLUID FLOW PRECISE SHUT-OFF VALVE

John D. Ralston, Indianapolis, Ind.

Application October 17, 1952, Serial No. 315,308

8 Claims. (Cl. 226—116)

This application is a continuation-in-part of my co-pending application entitled Valve, filed November 19, 1948, Serial No. 60,925, allowed April 28, 1952, now Patent No. 2,619,116 of Nov. 25, 1952.

This invention relates to valves and particularly to a structure employing a valve which may be operated to give precise opening, opening dwell, and shut-off all with no "after" drip.

In the present invention, the same fundamental valve structure as shown, described, and claimed in said co-pending application is employed, wherein there is a coned nose core or plunger seating in the open end of the resilient tubular valve seat.

While the invention has many and widespread applications, it finds particular use in the field of filling vessels, such as bottles having relatively small mouth openings, where precision is of the utmost need, primarily as in the field of filling containers with pharmaceuticals.

In this particular filling field, all types of liquids are encountered, having an extremely wide range of specific gravities and viscosities, such as in the range from alcohols to thick, viscous syrum-like liquids of a sticky, adherent nature. Also, there are included in this field many of the liquids which will foam considerably, including milk, beer, and many of the sugar-content liquids.

Then another situation which is encountered in the filling field is that there is an extremely wide range of the size of the containers, and particularly is there a wide range in the mouth openings of these containers. Again, some of these containers must be filled to within a very close proximity to the mouth opening, and this mouth opening is at the top of a neck which is restricted in cross diameter section in respect to the container as a whole, meaning that the last bit of the filling material causes an extremely rapid elevation of material within the container as it comes up within the neck portion. With this situation there is the complication as above indicated of foaming in some of the liquids.

Furthermore, the time element is of vital concern since the containers must be filled as rapidly as possible in order to secure sufficient speed of production to hold down the cost in the filling operation.

In filling the containers, the industry has long desired and sought some type of filling control valve whereby as one container is passed on from the filling station, there will be no spilling over or after feeding or dropping of the liquid onto the outside of the container. This is particularly important where the container has to receive a label adhesively united or secured to the outside of the container to mark its contents. In the pharmaceutical field again, this is of the highest importance because the label must adhere to the container in order to designate the contents thereof at all times. It has been the practice in the filling operations heretofore employed to have to clean the outsides of the containers before being labeled in order to avoid that possibility of the labels becoming disunited from the containers due to the film of residual material remaining thereon.

With the use of my invention, all of this cleaning of the containers is entirely avoided after the filling operation, and the filled containers can go directly to the capping station and also to the labeling station. Of course there is also the further result obtained of a saving of the material in that it is not dribbled out of the filling valve from container to container during the filling operation. Again, by the very precise cut-off obtained by use of my valve, precision filling is made entirely possible so that not only is the consumer obtaining the entire amount of the liquid as intended, but also the manufacturer is able to conserve the liquid in that some bottles or containers are not overfilled as a matter of precaltion to obtain the full amount as designated upon the label.

Another particular advantage of the invention is that when it is employed to control the flow of water in a household, such as at the lavatory, the bath tub, or the flush tank of a water closet, there will be no afterflow or drip of the water when the valve closes. In many localities, this is of great importance, particularly where the water has a high iron content which produces a discoloration of the porcelain or enameled surfaces upon which the water might otherwise drip. By use of my invention, this discoloration is entirely prevented.

Although in most filling operations there will be a time control device employed primarily for the opening and the maintaining of the opening of the valve, such control device does not form a part of the present invention and is not therefore illustrated nor described herein.

The invention further finds application in the field of handling gases, so that the invention finds usage in the broad field of handling fluids, including both liquids and gases.

Further advantages of the invention will become apparent to those versed in the art in the following description as illustrated in the accompanying drawings, in which:

Fig. 2 is a top plan view of an enlarged scale of the valve head;

Fig. 3 is a view in side elevation and section of the valve head;

Fig. 4 is a detail in side elevation and partial section of a valve discharge nozzle for high volume flow;

Figure 1:
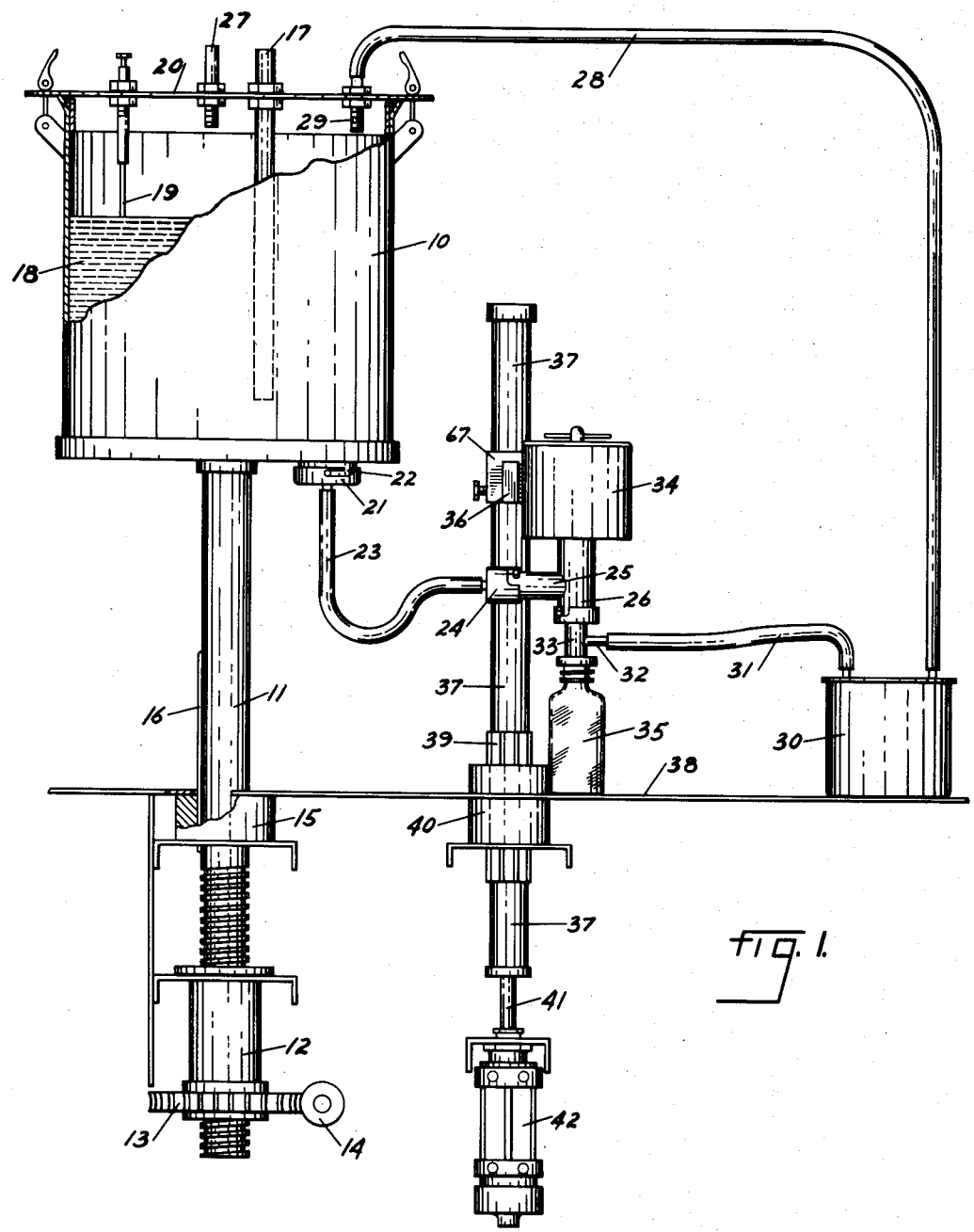
Fig. 1 is a view in general diagrammatic form in elevation and partial section of the invention as employed in a filling structure.

For a filling operation, a general organization may be employed such as is illustrated in Fig. 1. A liquid supply tank 10 is mounted on a post 11 which is screw-threadedly supported through a sleeve 12. A worm wheel 13 is secured to the sleeve 12, and is revolved by means of a worm 14 driven either by hand or by any suitable power means, such as by a motor (not shown). The post 11 may thus be raised or lowered to any desired degree of elevation by turning of the worm 14. The adjustment of the position of the post 11 is made at the beginning of any filling operation depending upon the height of the container to be filled, and also the nature of the liquid which is being used. After the adjustment is secured, the tank 10 is allowed to remain at a constant elevation where means may be provided to control in-flow of the liquid for maintenance of a constant liquid level. The post 11 is guided through a collar 15, and a key 16 fixed to the side of the post 11 is slidably carried through the collar 15 to prevent rotation of the post 11 about its axis.

Liquid may be supplied from any suitable storage space to enter the tank 10 through a supply pipe 17. The liquid 18 is maintained at a constant elevation in respect to the fluid flow shut-off valve in order that there may be a constant head or pressure at the valve. In Fig. 1 in one such means for maintaining a constant level of the liquid 18, the tank 10 is held stationary through use of the common expedient of an electrode 19, between which and the wall of the tank 10, a circuit may be completed as a means of controlling the liquid delivering means to the pipe 17. Both the electrode 19 and the supply pipe 17 are herein shown as being mounted on a tank cover 20 which may be quickly removed for cleaning and sterilization of the inside of the tank 10 as the case may arise. When it is not desirable to employ the electrode 19 or its equivalent to maintain the liquid level, then the level may be maintained by any suitable method, such as the changing of the elevation of the tank 10 through the screw shaft 11 to vary the tank elevation to maintain a fixed liquid level.

From a quick detachable connector 21 engaging a nipple 22 which constitutes an outlet at the bottom of the tank 10, there leads a flexible tube or pipe 23 to discharge through a quick detachable connector 24 into the flow tube 25 which in turn is connected to and discharges into the valve chamber 26.

When the "head" space above the level of the liquid in the container to be filled is exceedingly small, and particularly where the liquid has a tendency to foam, the tank 10 has the cover 20 mounted thereon in a sealed manner and the pressure within the tank 10 is reduced to below atmospheric pressure by means of a vacuum producing connection 27 leading through the cover 20. In the use of the vacuum, there is a pipe or tube 28 leading from a connection 29 through the cover 20 to a liquid separator unit 30. In turn, a flexible tube 31 leads from the separator 30 to interconnect through a nipple 32 with the interior of a sleeve 33 disposed about the discharge of the valve as will be further explained hereinafter.

The valve head is generally designated by the numeral 34, and it is supported through a bracket 67 on a cross arm 36 extending from an upright post 37.

In these instances where the use of vacuum is not required, the valve head 34 will be fixed at an elevation such that the liquid 18 may flow by gravity from the tank 10 through the tube 23 to the valve chamber 26. However, when the vacuum is employed, then it is desirable that either or both the valve head 34 or the container or bottle 35 be reciprocated vertically one in respect to the other. Where the bottles 35 are to be fed past the under side of the valve head 34 in a straight-line direction, the valve head 34 may be reciprocated while the bottle 35 is held at a fixed elevation. However, in case the rotary system of feeding bottles 35 to the valve may be employed, then the head 34 may remain at a fixed elevation and the bottle 35 be reciprocated vertically in respect thereto. In the present showing, however, the head 34 is reciprocated in respect to the bottle 35 which travels across a table 28, the conveying means not being herein shown or described.

The post 37 has fixed thereto a splined collar 39 which may reciprocate vertically through a sleeve 40 which is held stationary. To the lower end of the post 37 there is connected through a rod 41 an air motor 42 which in timed sequence may be operated to reciprocate the shaft 37 vertically in respect to the travel of the bottle 35 along the table 38. The timing mechanism for operating the motor 42 is not herein shown or described since it is not a part of the present invention pre se, and may consist of any of the well known instrumentalities such as a solenoid operated valve.

The valve operating head 34, for electrical operation, embodies a magnet winding 43 mounted about a central vertically disposed iron core 44 within an inverted ferrous cup 45. A stem 46 extends revolubly axially and downwardly through the core 44 to engage by a lower screw-threaded end within a boss 47 secured to the top closure end 48 of the valve chamber 26.

By means of the stem 46 engaging screw threadedly in the boss 47, the valve chamber 26 may be pulled upwardly to abut snugly against the lower end of the core 44. To facilitate the quick positioning of the valve chamber 26 in this manner and also of its disengagement for cleaning purposes, there is provided on the upper end of the stem 46 a handle 49.

Preferably the cup 34 extends downwardly below the under side of the winding 43 to carry a lower ferrous closure 50 through which the upper end portion of the chamber 26 may freely pass and also serve as a lateral guide in bringing the chamber 26 upwardly into engagement with the lower end of the stem 46 through the intervening boss 47. Furthermore, in order to stabilize the chamber 26, the boss 47 fits within the lower end of the core 44 with a sliding fit as indicated in Fig. 3.

Primarily the cup 34 and the closure 50 form a magnetic circuit exteriorly of the winding 43, with a gap across the tube 26.

Figure 6:
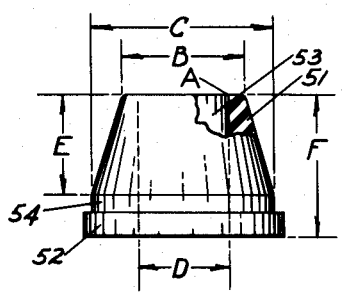
Fig. 6 is a side elevation and partial section of the valve seat.

A valve seat generally designated by the numeral 51 generally tubular, with a constant diameter bore therethrough, is entered relatively upwardly in the lower end of the chamber 26 to have an annular flange portion 52 engage the lower end of the chamber 26 as an abutment limiting the entrance of the seat 51 within the chamber 26. This valve seat 51 is shown in Fig. 6, and while the invention is not to be limited specifically thereto, for a wide range of uses, the general proportioning of the dimensions of the seat 51 will be such that E, the free exposed length within the chamber 26, will be .750 inch; the diameter C will be substantially that of the internal diameter of the chamber 26, namely, in the present example, 1.375 inches; B, the external end diameter, will be substantially .932 inch; the diameter D of the bore 53 through the valve seat 51 will be substantially .687 inch; and there will be a cylindrical portion 54 of C diameter immediately above the flange 52 which has a diameter substantially that of the outside diameter of the wall of the chamber 26, making the overall height of the valve seat 51, F, to be substantially 1.052 inches.

A very important feature of the valve seat 51 is that there be a corner A, not rounded in any appreciable degree nor irregular in contour. Furthermore, it is essential that the valve seat 51 be made out of an elastic material, this material preferably being one of the present synthetic rubbers so that the material will be substantially non-deteriorating in the presence of oily substances. One such material is that now being sold commonly under the trade-name "Neoprene," having a durometer of from forty-five to fifty.

This valve seat 51 is inserted in the lower end of the valve chamber 26 to have the cylindrical portion 54 engage with a sliding and frictional fit with the inside face of the chamber 26, and to have the flange 52 abut the lower end of the chamber wall 26.

A nozzle generally designated by the numeral 55 is inserted within the bore 53 of the seat 51 a distance determined by the flange 56 which extends annularly around the outer side of the nozzle 55. This flange 56 extends radially from the axis of the nozzle 55 a distance sufficient to permit it to extend outwardly under the seat 51. The connector cup 57 telescopes slidingly up over the lower end of the chamber 26 to have the nozzle 55 extend downwardly therethrough, and to have the connector cup 57 engage the under side of the nozzle flange 56 and the under side of the remaining exposed portion of the seat 51 to compressively engage the flange 52 against the lower end of the chamber 26, the connector 57 being connected to the chamber 56 by any suitable means, herein shown as by the usual and well known bayonet connection.

In this assembly, it is to be noted that the valve seat 51 while having a cylindrical bore centrally therethrough has its outer wall spaced inwardly and away from the wall of the chamber 26 from that portion of the seat which extends above the cylindrical portion 54 either by a cylindrical shape, or as herein shown in frusto-conical shape, so that there is clearance between that upper end portion of the seat 51 entirely around and between it and the wall of the chamber 26, Fig. 3.

The nozzle 55 may, as a factor of safety, extend within the bore 53 a distance slightly beyond the upper edge of the cylindrical portion 54 so that this nozzle 55 above the flange 56 serves as means for preventing a possible collapse inwardly of the seat portion 51 about the floor end of the chamber 26 and within the connector cup 57, in effecting a liquid seal between the seat 51 and the lower end of the chamber 26. The nozzle 55 extends below the flange 56 as a continuation of the seat base 53 and below the under side of the cup 57 a distance depending upon the nature and the volume flow of the fluid being controlled by the valve. The diameter of the bore 58 of the nozzle 55 may vary as may also the bore D of the seat, with the fluid and its volume being handled. That is, for a fluid such as alcohol, the bore 58 may be held to a small size whereas in a highly viscous fluid, the bore will be increased in diameter. It is the intent, particularly in filling vessels with liquids, that the flow rate of the liquid being employed be held to as low a rate as possible in order to prevent undue turbulence within the vessel, and yet the flow must be sufficiently rapid to prevent an undue time delay during the flow period so that the production time will be within economical ranges depending upon the nature of the fluids. However, it is to be noted that the exact diameter of the bore 58 for any particular fluid is not highly critical since it may vary somewhat, the full control being not only those elements just enumerated, but most importantly, that the fluid remaining below the top edge A of the valve seat 51 may hang within the seat bore 53 and the bore 58 of the nozzle 55 with a lower meniscus end of the retained fluid spaced above the lower end of the nozzle as will hereinafter be more fully explained in the operation of the valve.

When a vacuum is employed to remove foam to permit filling of a container 35, such as is indicated in Fig. 3, where there is very little head room space 59, the nozzle 55 is preferably extended below the connector cup 57 by a tubular length 60. This length 60 is such that it may be entered within the neck 61 of the container 35 to approximately the level 62 to which the fluid is to be brought within the container. The sleeve 33 is screw-threadedly connected to the portion of the nozzle 55 immediately below the cup 57, Fig. 3, to provide a quick detachable connection therewith. The internal diameter of the sleeve 33 is such that there is a clearance 63 provided between the sleeve 33 and the tube 60.

On the lower end of the sleeve 33 there is placed a sealing gasket 64 which will rest over the top end of the neck 61 when the tube 60 is inserted within that neck to the desired distance. This gasket 64 may be made out of any suitable elastic material such as rubber or synthetic rubber, and the seal does not have to be perfect between it and the top rim of the neck 61. A bleed passage 65 is provided through the sleeve 33, preferably opposite to the entrance of the nipple 32.

As has been indicated, the diameter 58 of the nozzle 55 may vary with the physical characteristics of the fluid being handled, particularly the variations in specific gravities and surface tensions. Where liquids such as alcohols are to be handled, the diameter 58 may run around three-sixteenths to a quarter of an inch, and for liquids having characteristics approaching that of water, the diameter may run up to three-eighths of an inch. However, when the diameter exceeds three-eighths of an inch, the relationship between the diameter and the characteristics of the fluid must be restored to those characteristics of the smaller tube action.

Figure 5:
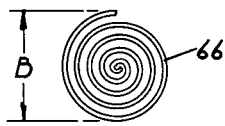
Fig. 5 is a top plan view of the coil employed in the nozzle of Fig. 4.

This relation is reestablished in the larger bore nozzles by a device as indicated in Figs. 4 and 5. This device consists of a piece of sheet material brought into a helical coil 66 and this coil is then inserted into the bore of the nozzle 55 with the normal elasticity of the material being sufficient to retain the coil in position by frictional contact with the wall of the bore. As indicated in Fig. 4, the vertical height of the coil is such that when the coil is inserted into the nozzle 55, the lower edges of the turns will be in the plane of the lower end at least of the nozzle, and the upper edges will be in a plane preferably not above the top end of the nozzle 55 within the bore 53 of the seat 51. The material of the coil is preferably quite thin, being on the order of .006 inch, such as would be employed in shim stock. The diameter B is of course contractible, so that the coil is slightly pressed from its original formation for retention when inserted within the bore 58. The spacing between turns of the coil may be varied in accordance with the characteristics of the fluid to be handled. In any event, however, the large diameter bore 58 is thus broken up into a continuous vertical, helical passageway of slight or low transverse width between turns of the coil 66 so that the surface tension effects may be employed between the fluids and the coil surfaces in order to control the quick stoppage of fluid through those passageways upon the shutting off of the valve. This will become more apparent in the description of the operation of the valve.

Figure 7:
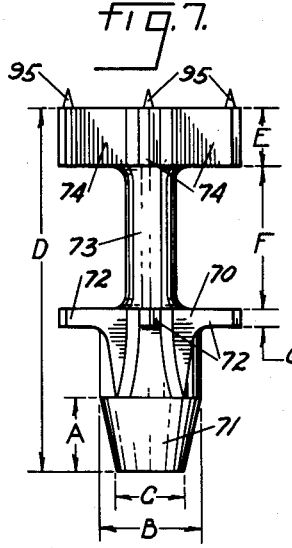
Fig. 7 is a side elevation of the valve plunger.
Figure 8:
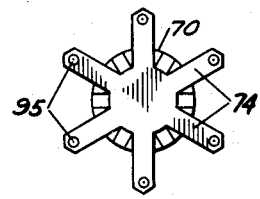
Fig. 8 is a top plan view of the valve plunger.

A plunger, generally designated by the numeral 70 is employed to complete the valve structure. This plunger 70 is illustrated in Figs. 3, 7 and 8. The plunger 70 is made out of a material which is resistant to corrosion by the various fluids which may be required to be handled by the valve, and preferably the plunger is given a hard chromium plate for further resistance. The material may be one of the presently so-called stainless steels, but it must have a sufficient iron content so as to be shiftable by variations in a magnetic field.

The lower end of the plunger 70 is provided with a head 71 which is tapered from a small diameter end C throughout a longitudinal length A to a larger diameter B. This taper is critical in respect to the pressure head to be handled by the valve. The taper of the head 71 is provided to permit the head 71 in part to enter the bore 53 of the seat 51 as indicated in Fig. 3 in order to effect a seal around the periphery of the head 71 and the corner or edge A of the seat 51. If there be too small a taper, the tendency of the head 71 will be to wedge into the seat 51 tending to increase the diameter of the edge A to that point where the head 71 tends to distort the seat unduly. Not only that, but quite a bit of force will be required to withdraw the head 71 from the seat 51. Also, if the pressure head of the fluid being handled through the valve is too great, the head 71 will tend to be driven too snugly into the seat 51. When the pressure head increases, the angle between the face of the tapered portion of the head 71 and the longitudinal axis of the plunger 70 may be increased to prevent this wedging action between the head and the seat 51.

For example, a sharper taper at a specific pressure will engage less in a less elastic seat whereas a blunter taper is equally adaptable to a seat of more elasticity and flexibility. A balance between the two is essential. Also, the weight of liquid in a very long and large bore delivery tube can by its downward weight pull the core further into the seat; this is in turn affected by the speed of the flow and sudden stopping of same.

As an example, in order to understand the proportions, particularly in relation to the suggested dimensions of one particular size of the seat 51 in reference to Fig. 6, the plunger head 71 will have relative dimensions as follows: When A is approximately 9/16 of an inch, C may be 15/32 inch and B 27/32 inch. These relative dimensions are not intended to constitute any limitation of the invention, but are given merely as an example, and primarily as suitable dimensions for use in connection with the valve seat 51 proportions as above indicated where the pressure head is very slight, such as would be employed in filling from the container 10, Fig. 1, where the flow is by gravity, and the difference in elevation between the fluid in the container 10, and at the valve seat would only account for a pressure of a small fraction of a pound per square inch.

The plunger 70, above the head 71, is provided with a plurality of radially extending arms 72, herein shown as six in number. The primary purpose of these arms 72 is to provide "armature" means tending to rise and enter the circular gap in the closure 50 to shorten the magnetic flux circuit as the plunger rises under energization of the coil 43. These arms 72 also serve as means for guiding of the head 71 in relation to the seat 51. The outer tips of these arms 72 will be in free sliding contact with the internal face of the chamber 26. The plunger 70 extends on upwardly from the level of the arms 72 by a stem portion 73, on the upper ends of which there are carried again a plurality of arms 74. These arms 74 extend radially from the axis of the plunger 70 to terminate in a common circumferential line of that diameter which will permit the outer tip edges of the arms 74 to be in free sliding contact with the inner face of the chamber 26, these arms 74 adding to the mass of the plunger 70 and to be attracted directly toward the underside of the core 44, tending to lift the plunger upon energization of the winding 43, and also serving as guides to maintain the plunger 70 in alignment with the chamber 26, wherein the longitudinal axis of the plunger 70 coincides approximately with the longitudinal axis of the chamber 26. The spacing apart of both sets of arms 72 and 74 permits passage of the fluid longitudinally of the plunger 70.

The top side of the arms 74 are preferably provided with means to withhold the entire top area of the plunger 70 and its arms 74 from intimate contact with the chamber top end 48 so as to eliminate the adhesion thereto of the plunger 70 under such conditions as in the valving of "sticky" liquids. Such means herein shown constitute spacer bosses 95, one extending upwardly from each finger 74.

The stem 73 is reduced in diameter from the diameter of the circles of the arms 72 and 74 primarily as a means to reduce the overall weight of the plunger 70.

Continuing the dimensions of the plunger 70, the stem would be 3/8 inch in diameter; D would be 2 3/4 inches; E, 7/16 inch; F, 1 1/16 inches, and G, 1/8 inch. The head 71 need not be a complete cone, but is sufficient to be frusto-conical. The essential feature is that the head portion coming into contact with the seat edge A be coned.

Where the plunger 70 may be desired to be manipulated by mechanical means other than by electromagnetic means, the height of the arms may be co-extensive with the length of the plunger above the head 71.

As has been indicated above, the valve structure will find many uses other than simply in filling operations. For example, Figs. 9 and 10, there are illustrated two different forms of use of the valve for water faucets such as may be employed at laboratories and the like.

Figure 9:
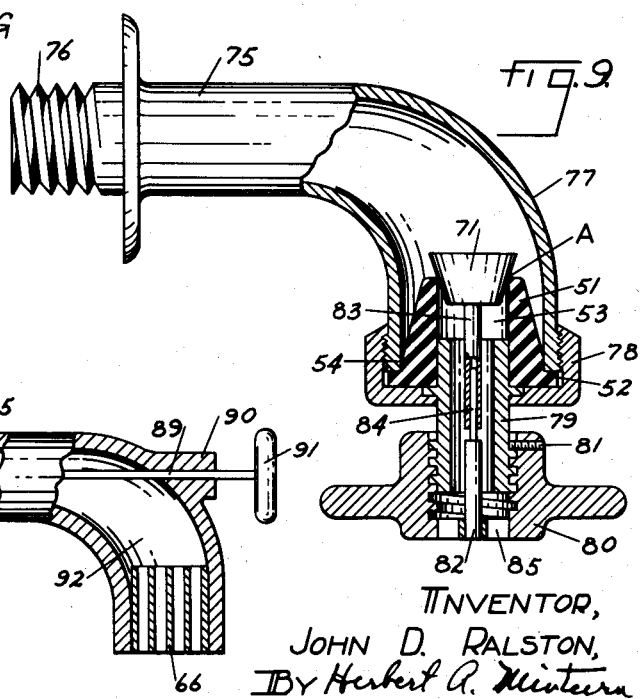
Fig. 9 is a view in side elevation and partial section of the invention as applied to a water faucet.

In the forms shown in Fig. 9, a sample structure is indicated wherein the body 75 has the usual threaded end 76 with a downturned delivery end 77. A nut 78 screw-threadedly engages over this lower end 77 to compressively engage the flange 52 of the valve seat 51 between the nut and the extreme lower end of the delivery portion 77. A nozzle 79 enters the bore 53 of the seat 51 that distance which will approximate the height of the cylindrical external wall 54 so as to prevent collapse of the seat 51 due to the compressing of the flange 52 by the nut 78. The seat 51 extends freely above the upper end of the nozzle 79 and tapers inwardly from contact with the internal face of the end portion 77.

The lower end of the nozzle 79 is screw threaded to receive an operating handle 80 screw threadedly thereon, limited by any such means as a set screw 81 to prevent complete withdrawal of the handle 80 from the nozzle 79. A post 82 is fixed centrally of the handle 80 to extend axially into the nozzle 79, and by reduced diameter portion telescope within the stem 83 of the plunger head 71. The reduced diameter portion 84 of the post 82 telescopes within the stem 83 by a free sliding action so that the plunger head 71 actually floats thereon. About the lower end of the post 82, the handle 80 is provided with a plurality of discharge openings 85. The pressure of the water in the body 75 normally retains the head 71 seated against the seat 51. In order to lift it for opening of the valve, the handle 80 is turned to bring the post 82 up into contact against the lower end of the stem 83 and thus lift the head 71 from the seat 51 for flow, the flow being down through the nozzle 79 and out the openings 85. When the handle 80 is released or turned, the pressure of the water within the body 75 will cause the plunger 70 to seat without being drawn downwardly positively by the handle 80. The reduced diameter portion 84 of the post 82 serves simply as a guide for the plunger 71.

Figure 10:
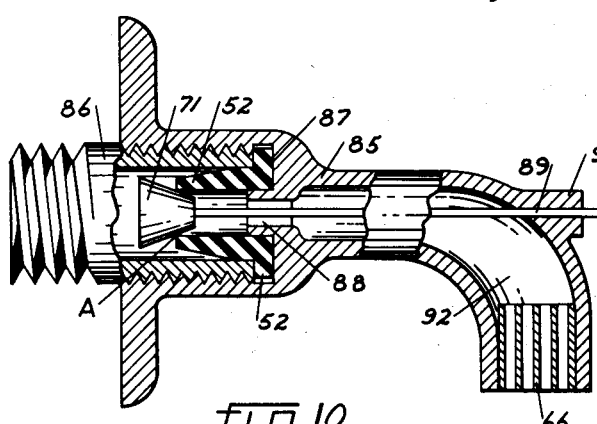
Fig. 10 is a view in side elevation and section of the invention as applied to a different form of water faucet.

In the form shown in Fig. 10, the valve arrangement may have the plunger head 71 working horizontally instead of vertically as has been shown in the other applications. In this form, the valve seat 51 is mounted within the body 85 by means of a nipple 86 screw-threadedly entering the body 85 to come into contact with the flange 52 to seat it against the abutment 87 provided in the body 85. Here again an integral nipple 88 extends into the seat 51 just that distance to retain the flanged end of the seat 51 in sealing engagement between the end of the nipple 86 and the abutment 87. From the head 71 there extends an operating rod 89 guided through a boss 90 to extend outwardly from the body 85 and have an operating button 91 on its outer end, so that by pressing the button 91 toward the body 85, the head 71 will be pushed away from sealing engagement with the seat 51. Water pressure normally retains the head 71 in sealing engagement with the seat 51. In this showing, Fig. 10, where there is a relatively large diameter bore 92 at the discharge end of the body 85, the helical coil 66 may be employed to good advantage to prevent the after drip of water when the plunger 81 seats against the member 51, this seating being occasioned by release of pressure against the button 91.

*Operation*

The operation of the valve will be first described in reference to the handling of liquids which have no undue tendency to foam.

With the liquid 18 supplied to the container 10 and brought to the level of the under side of the electrode 19, Fig. 1, and the electromagnet 43 being suitably connected with a time controller (not shown), bottles 35 are brought to a standstill one after another directly below the nozzle 55, whereupon the entire head 34 will be reciprocated to lower the sealing gasket 64 against the mouth of the bottle 35 as indicated in Fig. 3, whereupon simultaneously the plunger 70 will be lifted under the magnetic force induced by the energized winding 43 so that the fluid may flow by gravity from the tank 10 through the hose 23 into the chamber 26 and then around the plunger head 71 and through the bore 53 of the seat 51 and out through the nozzle bore 58 to drop into the bottle 35. The winding 43 will remain energized for that time interval until the fluid reaches its level 62 in the bottle 35 whereupon the winding 43 is deenergized and the plunger 70 drops by gravity to seat on the edge A of the seat 51. At the instant of seating, there will still be a column of the liquid in the bore 48 of the nozzle 55, this column tending to drop downwardly, but in so doing, a vacuum is induced immediately around the lower end of the plunger head 71 within the bore 53, while the seat 51 above upper end of the nozzle 55 is momentarily, slightly contracted in effect; that is, having a tendency to be distorted to reduce in effect the volume of the upper end portion of the bore 53 with the plunger head 71 at a slightly lower position than it would normally assume.

The elasticity of the wall of the seat 51 quickly returns the plunger head 71 to its upper, normal position of rest while still adhering to the edge A aided by the pressure of the liquid surrounding the seat 51 within the chamber 26, thereby tending to pull back the column of the liquid in the tube 58 so that the lower end of that column then is lifted, slightly at least, above the orifice of the lower end of the tube 60, thereby producing a "snap" action tending to jerk off the liquid at the lower end of that column at the lower end of the tube 60 just as the column is being lifted in the tube 60. This gives the precise cut-off action desired, plus the fact that there is no "after" drip of the liquid from the tube 60.

Under the worst conditions probably encountered in filling where the type of bottle 35 is employed as indicated in Fig. 3 with very little head space 59, being available, and particularly with the use of a foaming type of liquid, the foam produced will tend to rise up above the level 62 and around the outer side of the tube 60 within the neck 61 of the container and possibly overflow the container, but with the use of a vacuum, this foam as it rises in the neck 61 will be "snuffed" up and out through the nipple 32 and the vacuum hose 31 to the separating chamber 30, this chamber being still under the influence of vacuum as induced by the hose line 28 from the chamber 10 having the slight vacuum above the fluid 18 produced therein. It is not necessary that the gasket 64 effect a complete seal over the mouth of the bottle 35, but only sufficient to permit the vacuum to lift the foam and carry it out through the nipple 32, it being possibly advisable to have a slight leakage if any between the gasket 64 and the mouth of the bottle in order to prevent the film of the liquid from seeping out over the mouth and down on the outer side of the neck 61 when the entire valve head is lifted away from the bottle 35. In order to prevent undue evacuation, the sleeve 33 is provided with a bleed hole 65 through its wall so that the evacuated condition is maintained only sufficient to lift the foam without interfering with the normal flow of the liquid from the tank 10 and through the seat 51 and the nozzle 60 into the container 35.

Where equalization of pressure is desired as between the tank 10 and the container 35 to permit accurate gravity flow, the bleed hole 65 will be closed or omitted, and the gasket 64 will form a complete seal over the bottle mouth. The same procedure would be usable under pressure filling. The controls for such negative or positive pressures do not form per se a part of the present invention, and hence illustration is omitted.

By suitable electric controls, immediately the fluid level 62 is obtained in the bottle 35, the head 34 is lifted upwardly to remove the tube 60 from the bottle 35, and the filled bottle 35 is moved on and an empty bottle is moved in to take its place and the entire action is repeated.

Under what may be termed normal filling operation, where sufficiently wide mouth bottles are employed and the liquid is not of an excessive foaming type, the tube 60 is not employed, and the nozzle 58 is merely relatively centered over the bottle or container with an intervening space between the discharge end of the nozzle and the mouth of the bottle so that the head 34 may then remain stationary in respect to its elevation.

With a higher rate of liquid flow per time interval through the nozzle 55 being desired, then the helical coil 66 is employed to change the characteristics of the column of liquid passing through the nozzle into a relatively less transverse width column so that the "draw back" action of the fluid in the seat 51 is obtained upon the seating of the plunger head 71 in the seat 51, in order to give the precise cut-off of the fluid flow and also to prevent "after" drip. The spiral or helical coil 66 permits the effective reduction in size of the bore through the nozzle to be had without restricting volume flow and without setting up any turbulence in the flow of the liquid through the nozzle, and therefore tends to reduce rather than promote foaming of the liquid as it discharges. While the liquid flowing through the coil 66 has an extremely narrow transverse width, and although it constitutes in itself a spiral column between the walls of the coil, the liquid itself has the characteristics of a single stream of liquid of smaller diameter than that of the bore rather than the characteristics of a solid stream of the diameter of the bore 58 through the nozzle 55.

The helical coil 66 primarily controls turbulence in the discharging stream reducing the turbulence to a degree of no consequence. A wire screen across the lower end of the nozzle 55 or tube 60, will promote a "no drip" condition, but it will not appreciably reduce turbulence, but rather promote it. The coil 66 will not be required in the vacuum removal of the foam. The coil 60 will primarily be used with relatively large diameter bores of the nozzle 55, such as one-half inch and larger, particularly with the less viscous liquids, such as alcohols and water.

Again it is to be emphasized that the tapered head 71 desirably makes contact with the seat 51 for all practical purposes approaching a circumferential line around edge A of the elastic seat 51. That is, this edge A grips the head 71 much in the nature of an elastic band, and with the correct proportioning as to weight of the plunger 70, its taper of the head 71 in respect to pressures to be exerted thereon, and the degree of elasticity of the seat member 51, the plunger 70 should not wedge into the bore 53 any further than is required to effect this substantial line contact with the edge A so that the plunger head 71 may be readily lifted by the magnetic effect of the energized winding 43, and at the same time, even under the slight head pressure employed by the relatively small difference in elevation between the edge A and the top level of the fluid 18 in the tank 10 and the weight of the plunger 70, a seal is had without leakage. Moreover, the elasticity of the tubular length of the seat 51 must be preserved, and must be that which will normally maintain the edge A substantially centered on the axial line through the bore 53, and yet will permit the travel of that edge longitudinally of the bore from the initial contact of the plunger head 71 with the edge A downwardly and then upwardly to the final resting position while maintaining sealing contact with the head 71. Again, the seat 51 while being of an elastic nature must be such that it will not take on any appreciable permanent deformation, nor will it buckle, but will always return to its substantially initial state.

The plunger 70 at no time is lifted from the seat 51 for valve open condition beyond that maximum position required for full flow through the bore 55, so that the travel of the plunger 70 to the closing position is such that the plunger momentum produces substantially only the pressure due to weight of the plunger plus the weight of the liquid head on the area of the seat 51, plus the weight effect of the liquid suspended below.

Operation of the valve in respect to the structures shown in Figs. 9 and 10 is now described. In the structure shown in Fig. 9 the head 71 only is employed without any of the superstructure as above described in reference to the plunger 70. The taper of this head 71 is made to be proportioned in relation to the water pressure being controlled through the body 75 of the faucet. In other words, the taper must be such that the head 71 does not wedge in the bore 53 of the seat 51 but still will seat at the edge A by approximate line contact around the plunger 71. The means of the stem 83 telescoping over the reduced diameter portion 84 of the post 82. The plunger 71 is self-seating under the pressure of the fluid (whether it be liquid or gas) thereagainst and needs only to be lifted and then released to self-close it. The hand wheel 80 may have threads of such pitch that the weight of the wheel 80 will always cause the wheel 80 to revolve and descend to its lowermost position as determined by the set screw 81, the nozzle being free of threads from that position of the set screw and the under side of the nut 78. Of course, other means may be employed such as springs (not shown) commonly employed to effect self-closing of such valves. As long as the hand wheel 80 is turned to its upper travel position, whereby the post 82 abuts the lower end of the stem 83 to hold the plunger 71 out of contact with the valve seat 51, water flow will be had down through the nozzle 79 and out through the discharge holes 85. While not shown, the helical coil 66 may be employed in the hand wheel 80 about the stem or post 82 to further induce the non-turbulent, non-drip action of the device, where the diameter of the bore through the nozzle 79 is larger than would normally set up the "non-drip" condition after the closure of the valve. It is to be noted that this action is available in this type of construction as well as in the filling nozzles and valves above described.

The structure shown in Fig. 10 illustrates a structure wherein the plunger head 71 may be reciprocated horizontally and work just as effectively as it would when it is reciprocated in a vertical direction. In this valve construction, Fig. 10, one suggested construction is illustrated wherein the same "non-drip" action is maintained in spite of the horizontal travel of the head 71. Here again the head 71 is self-seating under the pressure of the fluid coming through the nipple 86 and the flow is obtained by pushing the hand or thumb button 91 inwardly in relation to the body 85 to unseat the plunger head 71. The head 71 has to be held in the unseated position by maintaining pressure on the button 91 for the desired length of flow of liquid through the body 85. Again in this form, if the bore through the end portion 92 is substantially 3/8 of an inch or above in diameter, then the helical coil 66 may be well employed in the outlet to achieve the same "non-drip" benefit action as is to be had in other types of structures.

In all cases, the essential operation is maintained as between the tapered plunger head 71 and the elastic seat 51 with the approximate line contact of the head 71 against the edge A of the seat 51. There must be that relationship plus the tubular length of the seat member 51 to achieve the preciseness of shut-off and also the advantage of the "non-drip" action.

While I have herein shown and described my invention in the precise forms and proportions, it is to be understood that the invention is not limited thereto.

I claim:

1. A fluid flow control valve structure comprising in combination, an elastic tubular member having a fluid flow bore therethrough; an elastic valve seat on one end of said tube; means supporting the tube in spaced relation from said end to provide a free length portion extending between said support means and said seat; a valve head having a coned section to enter said seat; means for guiding said head substantially in axial alignment with said tube in travel toward and away from said seat; said head being normally urged to seat on said seat; means for lifting the head from said seat; said seat and said coned section being characterized by the elasticity of the seat causing the seat to grip the head around its coned portion and adhere to said portion in sealing relation during a momentary period in seating on said seat when the head tends first to compress the tube axially and then under the elasticity of the tube rebound axially, and the taper of the head permits the tube to return to substantially its original normal shape about said seat; a fluid containing chamber; said tube free length portion entering said chamber to be exposed therein to be subject therearound to pressure of the fluid thereagainst.

2. A fluid flow control device comprising in combination, a free length of an elastic tube having fluid intake and discharge ends; a valve member seatable on said intake end; means for maintaining a supply of fluid about said tube; a nozzle extending from said discharge end; a sleeve telescoping over a portion at least of said nozzle providing an annular chamber between the sleeve and nozzle closed off at its end directed toward said tube; and a connection on said sleeve opening therein, and variable pressure means communicating with said connection for varying the pressure in said chamber.

3. A fluid flow control device for filling containers comprising in combination, a free length of an elastic tube having intake and discharge ends; a valve member seatable on said intake end; a tube extending from said discharge end; a sleeve surrounding a portion at least of said tube to define therebetween an annular chamber closed at its end directed toward said free length; a conduit opening into said chamber; a fluid tank supplying fluid about said tube free length; said conduit connecting with said tank for pressure control at both of said tube ends; and sealing means about said sleeve for sealably interconnecting said sleeve with said container to have said chamber open into the container.

4. A fluid flow control device for filling containers comprising in combination, a free length of an elastic tube having intake and discharge ends; a valve member seatable on said intake end; a tube extending from said discharge end; a sleeve surrounding a portion at least of said tube to define therebetween an annular chamber closed at its end directed toward said free length; a conduit opening into said chamber; a fluid tank supplying fluid about said tube free length; said conduit connecting with said tank for pressure control at both of said tube ends; and sealing means about said sleeve for sealably interconnecting said sleeve with said container to have said chamber open into the container; said sleeve having an opening to the atmosphere for setting up a "snuffing" action when said chamber is evacuated.

5. A fluid flow control device for filling containers with fluids likely to foam, comprising in combination, a valve chamber; means supplying the fluid to said chamber; said chamber having a discharge opening; a valve seat at said opening; a shiftable valve core seatable on said seat withholding flow of fluid through said opening; means for actuating the core; a fluid discharging tube extending from said chamber opening below said seat; a housing carried in spaced relation about said tube, open at its lower end and closed about the tube at its upper end; a sealing member carried by the housing against which a container may sealably connect to have the housing open into the container and also have said tube discharge into the container; said housing having a discharge opening externally of said container; and means applying a partial vacuum at said housing discharge opening.

6. The structure of claim 5 in which said housing has a bleed passageway from the atmosphere opening into the housing.

7. A control device for filling containers with fluids having a tendency to foam, comprising a valve chamber with an outlet member; a valve seat; a cup attachable to said chamber through said outlet member and carrying said seat; a valve core in said chamber seatable on said valve seat; a tube carried by and extending from said cup; a housing carried by said cup in spaced relation from and around said tube, closed off at its cup end and terminating short of the end of the tube spaced from the cup, defining a housing annular opening around the tube; a container sealable member carried around said housing; said housing having a lateral opening; and vacuum producing means connecting with said housing lateral opening.

8. The structure of claim 5, in which said fluid supplying means comprises a closed tank shiftable in elevation; means for shifting the tank; and said vacuum applying means being interconnected with said tank above fluid level therein, and including a passageway to the upper portion of the tank from said housing discharge opening.

References Cited in the file of this patent

UNITED STATES PATENTS

| | | |
|---|---|---|
| 1,575,423 | Fenton | Mar. 2, 1926 |
| 2,321,017 | De la Calle | June 8, 1943 |
| 2,619,116 | Ralston | Nov. 25, 1952 |

FOREIGN PATENTS

| | | |
|---|---|---|
| 501,354 | France | of 1920 |